United States Patent
Rendina

(10) Patent No.: US 6,620,324 B2
(45) Date of Patent: Sep. 16, 2003

(54) METHODS FOR PURIFYING A SOLVENT

(76) Inventor: David Deck Rendina, 967 Heritage Blvd, North Vancouver B.C. (CA), V7J 3G6

( * ) Notice: Subject to any disclaimer, the term of this patent is extended or adjusted under 35 U.S.C. 154(b) by 0 days.

(21) Appl. No.: 09/923,642

(22) Filed: Aug. 7, 2001

(65) Prior Publication Data

US 2002/0014456 A1 Feb. 7, 2002

Related U.S. Application Data

(60) Provisional application No. 60/223,427, filed on Aug. 7, 2000.
(51) Int. Cl.$^7$ ................................................ B01D 11/00
(52) U.S. Cl. ...................... 210/634; 134/10; 210/663; 210/690; 210/806; 423/53; 423/62
(58) Field of Search ............................ 134/10; 210/633, 210/634, 638, 650, 663, 669, 691, 702, 710, 748, 749, 764, 772, 787, 806, 644, 804; 423/53, 54, 55, 509, 62, 658, 5

(56) References Cited

U.S. PATENT DOCUMENTS

| | | | | |
|---|---|---|---|---|
| 4,822,590 A | * | 4/1989 | Morrison et al. | ............. 423/53 |
| 4,853,359 A | * | 8/1989 | Morrison et al. | |
| 5,110,733 A | * | 5/1992 | Kim et al. | ................... 210/638 |
| 5,330,658 A | * | 7/1994 | Grant et al. | |
| 5,618,432 A | * | 4/1997 | Rewitzer et al. | ............ 210/634 |
| 5,755,969 A | * | 5/1998 | Okamoto | ..................... 210/691 |
| 5,879,555 A | * | 3/1999 | Khudenko | ................... 210/663 |
| 5,980,749 A | * | 11/1999 | Rendina | ..................... 210/633 |

* cited by examiner

*Primary Examiner*—Joseph Drodge

(57) ABSTRACT

An improved inclusive method for purifying a polar solvent such as water includes the re-suspension of finely divided layered materials within which contaminants have been captured, wherein the re-suspension is in a solvent selected primarily on the basis of its ability to re-suspend the finely divided layered materials and/or for its effect on the included contaminant material, and within which additional materials may or may not be intentionally dissolved, mixed, or suspended, in order to recover and reuse the finely divided layered material and/or to selectively recover a specific included contaminant or several specific included contaminants in series. The process is useful in the rapid and efficient recovery of the finely divided layered materials, and in the removal of suspended particles, dissolved materials, immiscible liquids, and living organisms from the polar solvent.

9 Claims, No Drawings

METHODS FOR PURIFYING A SOLVENT

RELATED REFERENCES

Reference is hereby made to commonly assigned provisional U.S. patent application IMPROVED METHODS FOR PURIFYING A SOLVENT, Ser. No. 60/223/427, filed Aug. 7, 2000, the benefit of which is hereby claimed and the disclosure of which is incorporated herein by reference.

FIELD OF INVENTION

The present invention relates primarily to the field of purification of polar solvents and miscible aprotic solvents and to methods for reclamation of both the purification agent and the impurities.

BACKGROUND OF INVENTION

In the applicant's U.S. Pat. No. 5,980,749 which issued Nov. 9, 1999 for an invention entitled "Inclusion Methods for Purifying a Solvent" new inclusive methods for purifying polar solvents were disclosed. These methods employ finely divided layered materials and preferably exfoliated layered materials, homogeneously dispersed in polar solvents to capture, by inclusion between layers, various impurities suspended, contained, mixed, or dissolved within the solvent.

The process disclosed in the '749 Patent has inherent limitations. For example, in the said process both layered materials that include impurities and layered materials that have included no impurities are consumed. Further, the speed with which the layered material includes impurities is limited in time by the rate at which suspended layered materials can be brought into contact with the impurities contained within the solvent.

Therefore, with respect to the speed of the purification process, it would be beneficial if an excess of layered material in relation to the impurities in the solvent could be utilized in order to provide a higher probability of rapidly contacting suspended particles of layered material with the impurities. However, the opposite condition is true when attempting to minimize consumption of layered material. Ideally, in order to minimize the quantity of layered materials consumed in the purification process, one would exactly match the quantity of layered material utilized, to the quantity of the impurity. In the field, this is usually impractical as the exact quantity and definition of the contaminant may be unknown. Further, valuable materials such as metals, metal salts, metal organic compounds, and organic solvents, and others may be included within layers. It may be economically beneficial to separate these materials from other contaminants and from the layered materials that were utilized to remove them from the solvent.

The process disclosed in the '749 patent is comprised of the steps of adding layered materials, and preferably exfoliated single molecule thick sheets of layered materials, suspended in a pure form of the solvent, to an impure form of the selected solvent. The process further includes, among others, the steps of agitating the combined materials and separating the settled layered material, which now contains the impurities from the pure solvent.

It is an object of the present application to disclose methods that insure a high probability that the layered materials rapidly contact contaminants and further insures that layered materials that did not include contaminants can be recovered and reused. Further, methods are described that allow impurities, that have been concentrated from a solution by inclusion in layered materials, to be separated from the layered materials in the concentrate so that the layered materials may be reused and/or the impurity may be recovered. Finally, a method is described whereby specific materials included within a mixture of contaminants removed from a solvent by inclusion within "re-stacked" layers of a layered material can be selectively removed.

Techniques currently employed to purify solvents by capturing impurities between restacked layers of previously dispersed layered materials require the consumption of both layered materials that have included impurities and layered material that has not included impurities. This use of an excess of layered material may make the inclusion methods for purifying solvents economically untenable in some circumstances. In economic comparisons where the cost of inclusion methods are related to the costs associated with other purification methods, the quantity of layered material used becomes critical.

For example, when compared economically to the cost required to purify a source of drinking water that has a specific type of contaminate, such as sea salt, the inclusion methods requiring an excess of homogenously dispersed suspensions of layered materials, may be more costly than other methods such as reverse osmosis if the layered material is consumed.

It would therefore be beneficial if the excess quantity of layered material could be reused. Further, it would be economically beneficial if selected valuable contaminates could be recovered after they have been removed from the solvent by inclusion between layers of restacked sheets, in order to off-set the cost of purification.

In some situations it may be economically prohibitive to purify a contaminated solvent by conventional methods because of the nature and/or volume of contaminant. For example a tailing pond associated with a mine may contain such a large volume of solvent, contaminated to such a high degree, that processes like reverse osmosis, or distillation would eliminate any profit from the sale of the resource. The recovery and reuse of the exfoliated layered material used in the inclusion process will make it more economically competitive with existing procedures.

DETAILED DESCRIPTION OF PREFERRED EMBODIMENTS

The inventor has discovered that all of the above objects may be accomplished by the following process:

1. Purifying an impure solvent by adding an excess amount of layered material, in relation to the amount of contaminants in the solvent, to the impure solvent so as to capture the contaminants between layers of the layered material;
2. separating the layered material containing the impurities from the purified solvent and re-suspending the layered material in a second polar solvent (a first re-suspension medium) selected either for properties inherent in the second solvent that have an effect on the impurities included within the layered material and/or which contain materials either mixed, suspended, or dissolved within the solvent that have an effect on the contaminants;
3. combining the effects of more than one re-suspension medium on the included material and/or the layered material.

Although there may be some property of a certain contaminant of a polar solvent, or a miscible aprotic solvent, that is attracted to the layered material employed as an inclusive purifier, it is not a requirement that the impurity be attracted to the layered material to insure its removal. The process of removing contaminants from solvents by inclusion within layered materials does however require that the contaminant be brought into physical contact with the suspended layered material. The preferred materials for use in the inclusion process are single molecular thickness layers of transition metal dichalcogenides.

Although not wishing to be bound by any particular theory, the inventor believes that the large surface area created by the dispersion of single molecule thick sheets throughout the contaminated solvent provides the most effective means for insuring that contaminants are included between layers when the layered material restacks. As the level of contaminants in the solvent is lowered by inclusion within sheets of restacked layered material it becomes more difficult to insure that remaining suspended layered material comes into contact with remaining impurities. The use of an excess of layered material is the first step in the process of the current invention, and simply insures that there is a higher probability that enough of the layered material to remove the impurity will rapidly come in contact with the impurity.

As can be seen from the experiments below, the second step in the process of the current invention is the act of re-suspending the "re-stacked" layered material in a similar or dissimilar polar or miscible aprotic solvent. This second solvent may have additional materials suspended dissolved or mixed in the solvent. These additions and these second solvents are selected on the basis of their effect on the included contaminant and/or lack of effect on the excess uncontaminated layered material's ability to re-suspend. This has the effect of making inclusion methods economically viable by insuring that the excess layered material is not wasted and/or that valuable inclusion materials may be recovered.

A variation on the second step of the process of the current invention, i.e., the act of repeatedly, re-suspending and "re-stacking" the layered material in a series of similar or dissimilar polar or miscible aprotic solvents that may or may not have additional materials suspended, dissolved, or mixed in the solvents, and where the additions and/or the solvents are selected on the basis of their effect on the included contaminant and/or lack of effect on any excess uncontaminated layered material's ability to re-suspend, may be useful in selectively removing a series of specific impurities and recovering a portion of the excess layered material.

Without wishing to be limited in the scope or in the spirit of the invention the inventors have included the following details of experiments to better illustrate how the invention may be employed.

BRIEF DESCRIPTION OF EXPERIMENTS

Experiment 1

In order to better illustrate how the process of the current invention may be utilized to improve on known inclusion methods for purifying polar solvents the following experiments were conducted.

a) Samples adding in total to 500 ml of water were obtained from a source known to be contaminated by biological organisms. The samples were obtained using sterile procedures in sterile containers and labeled as "control water". A sample of the control water was cultured under aseptic protocols and an analysis of the culture was conducted after 48 hours which revealed that biological organisms had proliferated to a growth rate of >2000 CFU/ml b) A second sample of the control water was prepared. Approximately 0.20 ml of a suspension of exfoliated layered material in distilled water at a concentration of 20 mg/ml was added by drops to 10 ml of this sample. The mixed solvents and suspension of exfoliated layered material was agitated by vigorous shaking and then centrifuged at 3000 RPM for 10 minutes. After centrifuging it was noted that a small amount of dark material was agglomerated in the bottom of centrifuge tube and that the remaining solvent appeared to be clear and transparent. 5 ml of the water without sediment was transferred into another sterile container using aseptic techniques. A portion of the sample was cultured. An analysis of the culture was conducted after 48 hours, which revealed that biological organisms had proliferated to a growth rate of 70 CFU/ml.

c) A third sample of the control water was prepared. Approximately 2.0 ml of a suspension of exfoliated layered material in distilled water at a concentration of 20 mg/ml was added to 10 ml of this sample. The mixed solvents and suspension of exfoliated layered material was agitated by vigorous shaking and then centrifuged at 3000 RPM for 10 minutes. After centrifuging it was noted that the remaining liquid was still slightly discolored by suspended exfoliated layered material and that the centrifuge tube had a substantial amount of sediment in the bottom. 5 ml of the liquid was decanted and put into another sterile container using aseptic techniques. A portion of that sample was cultured. An analysis of the culture was conducted after 48 hours, which revealed that biological organisms had proliferated to a growth rate of 12 CFU/ml.

This experiment clearly demonstrated that the ability of exfoliated layered materials to remove a greater quantity of biological contaminants, within a given time, is increased when there is an excess of exfoliated layered material added to the contaminated sample. However, because the quantity of contaminants removed does not progress in a linear manner when compared to the quantity of exfoliated layered material it is believed that a substantial quantity of exfoliated layered material consumed in the process does not contain contaminants.

Experiment 2

The following experiment were conducted in order to illustrate how an excess of layered material used in improved inclusive methods for purifying solvents can be recovered and reused by re-suspending the excess layered material in a polar solvent that affects only the included material:

a) A sample of the same source water as in experiment 1 above was labeled control water. A portion of this sample was cultured under aseptic protocols and an analysis of the culture was conducted after 48 hours which revealed that biological organisms had proliferated to a growth rate of >2000 CFU/ml b) A second sample of the control water was prepared. Approximately 0.20 ml of a suspension of exfoliated layered material in distilled water at a concentration of 20 mg/ml was added by drops to 20 ml of this sample. The mixed solvents and suspension of exfoliated layered material was agitated by vigorous shaking and then centrifuged at 3000 RPM for 10 minutes. After centrifuging it was noted that a small amount of dark material was agglomerated in the bottom of centrifuge tube and that the remaining solvent appeared to be clear and transparent. 5 ml of the water without sediment was transferred into another sterile container using aseptic techniques. A portion of the sample was cultured. An analysis of the culture was conducted after 48 hours, which revealed that biological organisms had proliferated to a growth rate of 400 CFU/ml.

c) A third sample of the control water was prepared. Approximately 2.0 ml of a suspension of exfoliated layered material in distilled water at a concentration of 20 mg/ml was added to 20 ml of this sample. The mixed solvents and suspension of exfoliated layered material was agitated by vigorous shaking and then centrifuged at 3000 RPM for 10 minutes. After centrifuging it was noted that the remaining liquid was still slightly discolored by suspended exfoliated layered material and that the centrifuge tube had a substantial amount of sediment in bottom. 5 ml of the liquid was decanted and put into another sterile container using aseptic techniques. A portion of this sample was cultured. An analysis of the culture was conducted after 48 hours which revealed that biological organisms had proliferated to a growth rate of 100 CFU/ml. The remainder of the liquid totaling approximately 40 ml was separated from the sediment by decanting and placed into a sterile container.

d) 15 ml of Isopropyl alcohol was added to the sediment remaining in the centrifuge tube from the experiment above. The sample was shaken vigorously to re-suspend the layered material. A portion of the layered material appeared to readily re-suspend, however a significant portion of the material did not appear to adequately re-suspend and appeared to be agglomerated. This sample was centrifuged for 10 minutes at 3000 RPM. The alcohol was decanted and the remaining sediment was again re-suspended—this time in 15 ml of distilled water—with similar results. The sample was set aside and undisturbed for approximately 1 hour and a portion of the suspended layered material settled. This settled material was separated from the remaining suspended layered material by decanting. The decanted layered material suspended in distilled water was added to sample decanted in step c) above. This combined sample was agitated vigorously by shaking and centrifuged for 10 minutes at 3000 RPM. 5 ml of the liquid was decanted and put into another sterile container using aseptic techniques. A portion of that sample was cultured. An analysis of the culture was conducted after 48 hours which revealed that biological organisms had proliferated to a growth rate of 0 CFU/ml.

This experiment clearly demonstrated methods that allow excess exfoliated layered materials employed in inclusion methods to be recovered and re-used.

Experiment 3

The following experiment was conducted in order to illustrate additional re-suspension techniques that may be employed to recover excess-layered materials used as inclusion materials for purifying solvents.

a) A 600 ml suspension of exfoliated layered material containing approximately 20 mg/ml of exfoliated material in distilled water was added to a 100 ml sample of distilled water within which approximately 0.1 gram of NaCl had been dissolved. The combined samples were mixed vigorously by shaking. Next the samples were centrifuged at 3000 RPM for approximately 10 minutes. On inspection it was noted that the layered material had formed a paste in the bottom of the centrifuge tubes. The clear water was decanted from the tube and examined by atomic adsorption spectrometry. The analysis revealed that the layered material had included approximately 98.6% of the sodium chloride. The sludge of layered material with inclusions of NaCl was recovered and re-suspended in isopropyl alcohol. Isopropyl alcohol was chosen as a re-suspension medium because NaCl is largely insoluble in alcohol. A portion of the layered material in the resulting mixture was easily re-suspended, however, a significant portion, estimated to be in excess of 70%, was somewhat agglomerated and the two could easily be separated by filtration through a wire mesh with a spacing of greater than 45 micron. Examination by Atomic Adsorption Spectrometry of the liquid portion with the apparently re-suspended layered material revealed sodium levels below the detectable level.

Experiment 4

The following experiment was conducted to illustrate that a mixture of included materials may be selectively separated by a series re-suspensions.

a) A sludge of layered materials with inclusions of LiOH and NaCL was recovered from a sample of distilled water within which the LiOH and NaCl had been dissolved. The sludge was re-suspended in distilled water, and a low voltage direct current was applied through electrodes positioned in the container. The layered material settled to the bottom of the container and gas evolved at both electrodes.

b) The sludge was recovered and again re-suspended in distilled water within which particles of an ion exchange medium, produced by the Bayer Corporation under the brand name Lewatit™, had also been suspended. The re-suspended layered material was agitated by vigorous shaking. The suspended material was then separated from the ion exchange material by filtration. The pH of the liquid with re-suspended material was measured and found to be neutral.

c) Next the liquid sample was centrifuged and the sludge recovered from the bottom of the centrifuge tube was re-suspended in alcohol. A substantial portion of the layered material in the resulting mixture was easily re-suspended, however, a portion was somewhat agglomerated and the two could easily be separated by filtration. After filtration the sample was centrifuged and the resulting sludge was re-suspended in water. Examination by Atomic Adsorption Spectrometry of the liquid portion with the re-suspended layered material revealed sodium and lithium concentrations below the detectable level.

As will be apparent to those skilled in the art in the light of the foregoing disclosure, many alterations and modifications are possible in the practice of this invention without departing from the spirit or scope thereof.

What is claimed is:

1. An improved method for purifying polar solvents and miscible aprotic solvents, using exfoliated layered material to entrap contaminants as inclusions, that provides a means to remove a high percentage of said contaminants and recover a quantity of the exfoliated layered material for reuse. Said method being comprised of the steps of:

a) applying inclusion methods for purifying a solvent to a contaminated solvent (X) while using an excess of suspended exfoliated layered material
b) separating a concentrate comprised of restacked exfoliated layered material entrapping contaminants as inclusions and restacked exfoliated layered materials without entrapped contaminants from said solvent
c) resuspending said concentrate in a second uncontaminated polar solvent (Y) in order to separate said layered materials entrapping contaminants from layered material without entrapped contaminants
d) separating said layered material entrapping said contaminants from said layered material without contaminants.

2. The method of claim 1 where the exfoliated layered material is an exfoliated transition metal dichalcogenide.

3. The method of claim 1 where wherein said separating step d) is accomplished by centrifugation.

4. The method of claim 1 where the said excess of exfoliated layered material is more than a 1:1 ratio of molecules of exfoliated layered material to molecules of said contaminants.

5. The method of claim 1 where said solvent (X) is water.

6. The method of claim 1 where said solvent (Y) is alcohol.

7. The method of claim 1 where said separating step d) is accomplished by decanting layered materials without contaminants suspended in solvent (Y) from settled layered materials entrapping contaminants.

8. The method of claim 1 where said separating step d) is accomplished by filtration.

9. The method of claim 1 where said separating step d) is accomplished by ion exchange.

* * * * *